Jan. 21, 1941.  H. H. SNYDER ET AL  2,229,605

GUIDE RAIL FOR CONVEYERS

Filed Sept. 11, 1939

INVENTORS
Harold H. Snyder.
Austin W. Secoy.
James H. McFee.
BY
ATTORNEYS

Patented Jan. 21, 1941

2,229,605

UNITED STATES PATENT OFFICE 2,229,605

GUIDE RAIL FOR CONVEYERS

Harold H. Snyder, Austin W. Secoy, and James H. McFee, Lancaster, Ohio, assignors to Anchor-Hocking Glass Corporation, Lancaster, Ohio, a corporation of Delaware Application September 11, 1939, Serial No. 294,274

2 Claims. (Cl. 198—204)

Our invention relates to guide rails for conveyers. It has to do, more particularly, with guide rails adapted to be associated with a conveyer for maintaining articles on the conveyer in a predetermined position.

It has been customary in the past with certain types of conveyers for articles, such as food packing containers, to provide guide rails disposed on opposite sides of the conveyer for engaging the articles and keeping them in a straight line on the conveyer so that they may be acted upon properly by sealing means or other units associated with the conveyer. When different size containers are positioned on the conveyer, it is necessary to adjust these guide rails towards or away from each other. In the past these guide rails have been mounted in such a manner that to adjust them it is necessary to loosen screws or other fastening means, then move the rails to a new position and then again tighten the fastening means. Obviously this takes considerable time and effort. Furthermore, it has been difficult to position the rails parallel to each other when adjusted into their new positions.

One of the objects of our invention is to provide guide rails of the type indicated associated with a conveyer which are so mounted that they may be easily and quickly adjusted without the use of any tools.

Another object of our invention is to provide guide rails of the type indicated which are adjustable relative to each other but which are so mounted that they will always be parallel to each other regardless to their position of adjustment.

The preferred embodiment of our invention is illustrated in the accompanying drawing wherein similar characters of reference designate corresponding parts and wherein.

Figure 1:
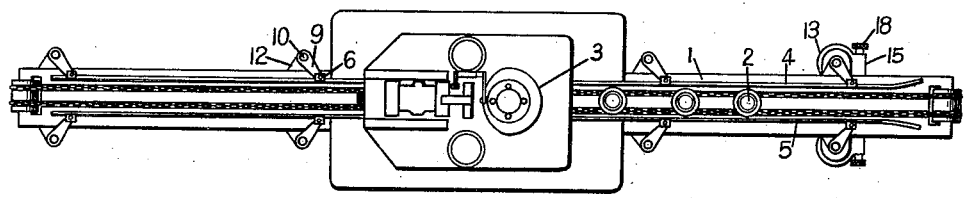
Figure 1 is a plan view showing our guide rails associated with the conveyer.
Figure 2:
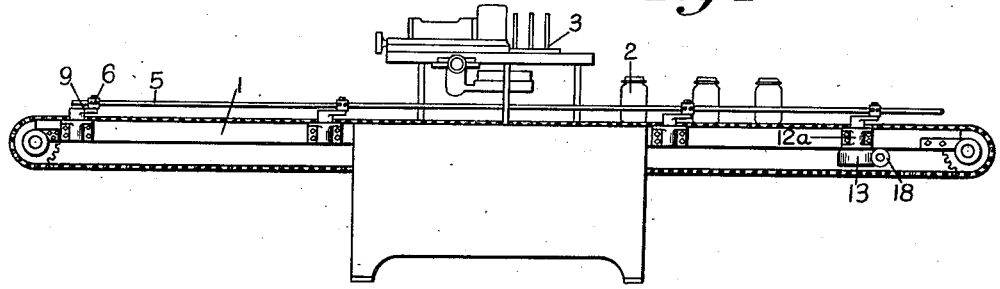
Figure 2 is a side elevation of the apparatus shown in Figure 1.

With reference to the drawing, I have illustrated a conveyer unit 1. This conveyer unit 1 may be of any suitable type and does not form a part of our invention. This conveyer unit is adapted to convey articles 2, which are shown as glass jars, to a unit 3 which may be a cap applying and sealing unit. For the unit 3 to act properly on the jars, it is necessary that they be properly positioned laterally of the conveyer, preferably at the center of the conveyer, and all be in a straight line. For this purpose it is necessary to provide guide rails.

We provide a pair of guide rails 4 and 5. These rails extend longitudinally of the conveyer and are disposed on opposite sides thereof. The rails are preferably made of bars of metal. At longitudinally spaced intervals each of the rails has a small block 6 attached thereto. Each block embraces the rail and is secured thereto by means of screws 7. Each block carries a pivot pin 8 for connecting the block to the free end of a crank arm 9, the opposite end of this crank arm is keyed to the upper end of a shaft 10. This shaft 10 is rotatably mounted in a sleeve 11 formed on the outer end of a bracket 12 which may be secured to the conveyer unit. The crank arms 9 are horizontally disposed and are spaced above the conveyer so that the guide rails will be spaced from the conveyer. The supporting units for the rails, embodying the crank arms and associating parts, are arranged in pairs as indicated, the units of each pair being disposed directly opposite each other.

Figure 3:
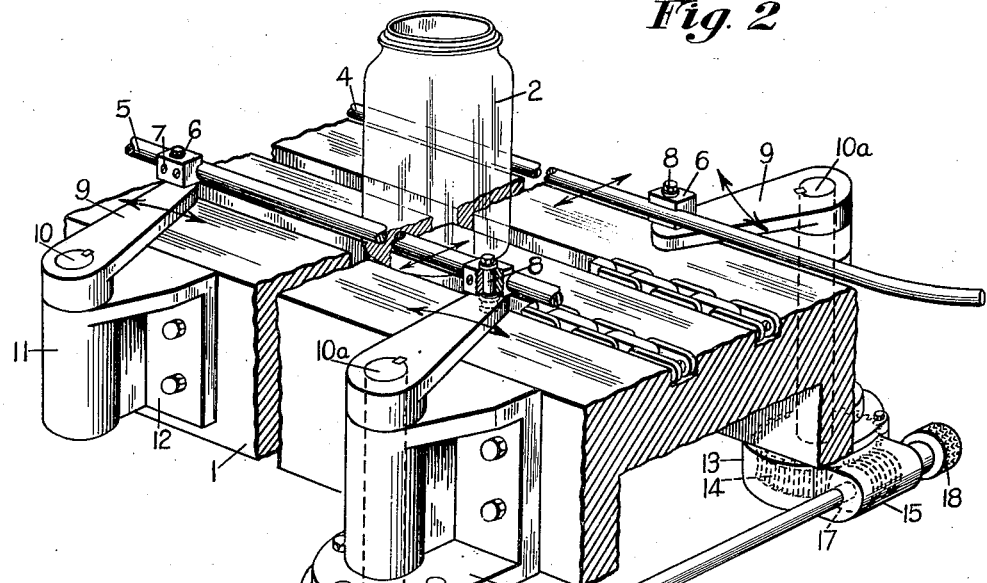
Figure 3 is a detail in perspective of a portion of the conveyer and showing how our guide rails are adjustably mounted.
Figure 4:
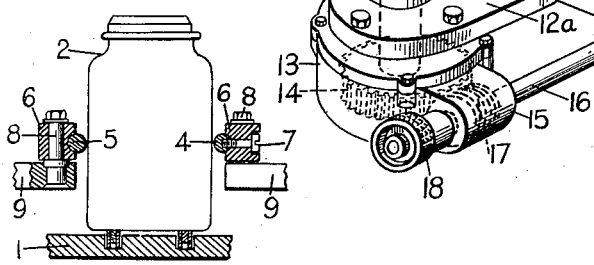
Figure 4 is a transverse section illustrating how the guide rails are positioned relative to an article on the conveyer.

One pair of these units is slightly different from the others as illustrated in Figure 3. In this instance the crank arms 9 and blocks 6 are the same as before and are connected together in the same manner. However, each of these crank arms is keyed to the upper end of a shaft 10a. The shaft is rotatably disposed in a sleeve formed in a bracket 12a secured to the conveyer unit. The bracket has a cylindrical housing 13 fastened to the lower end thereof. The shaft 10a extends downwardly into this housing and has a worm gear 14 keyed thereon. Each of the housings 13 has a lateral extension 15 formed thereon. A transverse shaft 16 extends through these extensions and is rotatably mounted therein. At each end of this shaft it carries a worm 17 which meshes with the cooperating worm gear 14. Each end of the shaft also carries a knurled knob 18 which is keyed thereto. By means of either of these knobs the shaft 16 may be rotated. One set of the worm and worm gears is machined lefthand and the other set is machined righthand.

It will be apparent that if the shaft 16 is rotated, both of the worm gears 14 will be rotated. This will rotate both shafts 10a and will cause the crank arms 9 keyed thereto to swing about the axes of these shafts. This will also cause all of the other crank arms 9 to swing about the axes of the shafts 10. Consequently the rails 4 and 5 will be adjusted towards or away from each other. The two rails will be moved to the same extent throughout their entire lengths. Consequently, they will always be maintained in parallel relationship. Furthermore, due to the worm and gear mechanism they will be locked in any position to which they are moved.

It will be apparent from the above description that we have provided guide rails so mounted that they may be adjusted quickly and easily without the use of any tools. The rails will be moved simultaneously towards and away from each other to the same extent and will be maintained parallel at all times. Furthermore, they will be locked in any position of adjustment.

Various other advantages will be apparent from the preceding description, the drawing and the following claims.

Having thus described our invention what we claim is:

1. In combination with a conveyer unit including a conveyer, guide rails for guiding articles along the conveyer, said guide rails being disposed in laterally spaced relationship and extending longitudinally of the conveyer, said guide rails being supported by supporting units disposed in pairs at longitudinally spaced intervals, each of said supporting units comprising a horizontally disposed crank arm, one end of said crank arm being pivotally connected to the rail, a vertically disposed shaft to the upper end of which the other end of the crank arm is keyed, a vertically disposed sleeve in which said vertical shaft is rotatably mounted, said sleeve being carried by a bracket fastened to the conveyer unit, worm gears keyed on the lower ends of the vertical shafts of a pair of said units, a transversely disposed shaft having worm portions thereon for engaging said worm gears so that they will be rotated simultaneously, housing portions secured to the brackets of said pair of units for enclosing said worm gears and worm portions, and means on each end of said transversely disposed shaft for rotating said shaft.

2. In combination with a conveyer unit including a conveyer, guide rails for guiding articles along the conveyer, said guide rails being disposed in laterally spaced relationship and extending longitudinally of the conveyer, said guide rails being supported by supporting units disposed in pairs at longitudinally spaced intervals, each of said supporting units comprising a horizontally disposed crank arm, one end of said crank arm being pivotally connected to the rail, a vertically disposed shaft to the upper end of which the other end of the crank arm is keyed, a vertically disposed sleeve in which said vertical shaft is rotatably mounted, said sleeve being carried by a bracket fastened to the conveyer unit, worm gears keyed on the lower ends of the vertical shafts of a pair of said units, and a transversely disposed shaft having worm portions thereon for engaging said worm gears so that they will be rotated simultaneously upon rotation of said transversely disposed shaft.

HAROLD H. SNYDER.
AUSTIN W. SECOY.
JAMES H. McFEE.

CERTIFICATE OF CORRECTION.

Patent No. 2,229,605. January 21, 1941.

HAROLD H. SNYDER, ET AL.

It is hereby certified that error appears in the printed specification of the above numbered patent requiring correction as follows: Page 2, second column, line 27, claim 2, for "worn" read --worm--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.